United States Patent [19]

Staron et al.

[11] Patent Number: 4,775,960

[45] Date of Patent: Oct. 4, 1988

[54] METHOD AND DEVICE FOR MEASURING VIBRATIONAL STRESSES AND VELOCITIES OF WAVES PROPAGATED WITHIN FORMATIONS SURROUNDING A WELLBORE

[75] Inventors: Philippe Staron, Mennecy; Georges Arens, Croissy S/Seine; Jean P. Panziera, Paris; Pierre Gros, Buc, all of France

[73] Assignee: Societe Nationale Elf Aquitaine (Production), Courbevoie, France

[21] Appl. No.: 942,774

[22] Filed: Dec. 17, 1986

[30] Foreign Application Priority Data

Dec. 20, 1985 [FR] France ............... 85 18915

[51] Int. Cl.$^4$ ............... G01V 1/40; G01V 1/30; G01N 29/00
[52] U.S. Cl. ............... 367/31; 367/27; 73/574; 73/581
[58] Field of Search ............... 367/25, 27, 31, 35; 175/50; 166/250; 181/105, 108; 73/574, 589

[56] References Cited

U.S. PATENT DOCUMENTS

| | | | |
|---|---|---|---|
| 2,200,476 | 5/1940 | Mounce | 73/574 |
| 3,028,749 | 4/1962 | Welkowitz | 73/589 |
| 3,132,509 | 5/1964 | Hagashi | 73/574 |
| 3,883,841 | 5/1975 | Norel et al. | 73/589 |
| 4,128,011 | 12/1978 | Savage | 367/35 |
| 4,446,541 | 5/1984 | Cowles | 367/31 |
| 4,449,208 | 5/1984 | Moeckel et al. | 367/30 |
| 4,641,520 | 2/1987 | Mao | 367/75 |

FOREIGN PATENT DOCUMENTS

| | | | |
|---|---|---|---|
| 0374534 | 3/1973 | U.S.S.R. | 73/574 |
| 0590639 | 1/1978 | U.S.S.R. | 73/574 |
| 2020024 | 11/1979 | United Kingdom | 73/589 |

*Primary Examiner*—Nelson Moskowitz
*Attorney, Agent, or Firm*—Foley & Lardner, Schwartz, Jeffery, Schwaab, Mack, Blumenthal & Evans

[57] ABSTRACT

A method for measuring vibrational stresses and velocities of waves propagated within formations surrounding a wellbore essentially consists in simultaneously measuring the vibrational stress and vibrational velocity produced by propagation of the vibration within the medium, then in establishing a ratio of magnitudes relating to the vibrational stress and velocity in respect of one and the same measuring point. The method and device provided by the invention also find applications in the separation of different types of secondary waves generated during propagation of a primary wave in a medium.

24 Claims, 1 Drawing Sheet

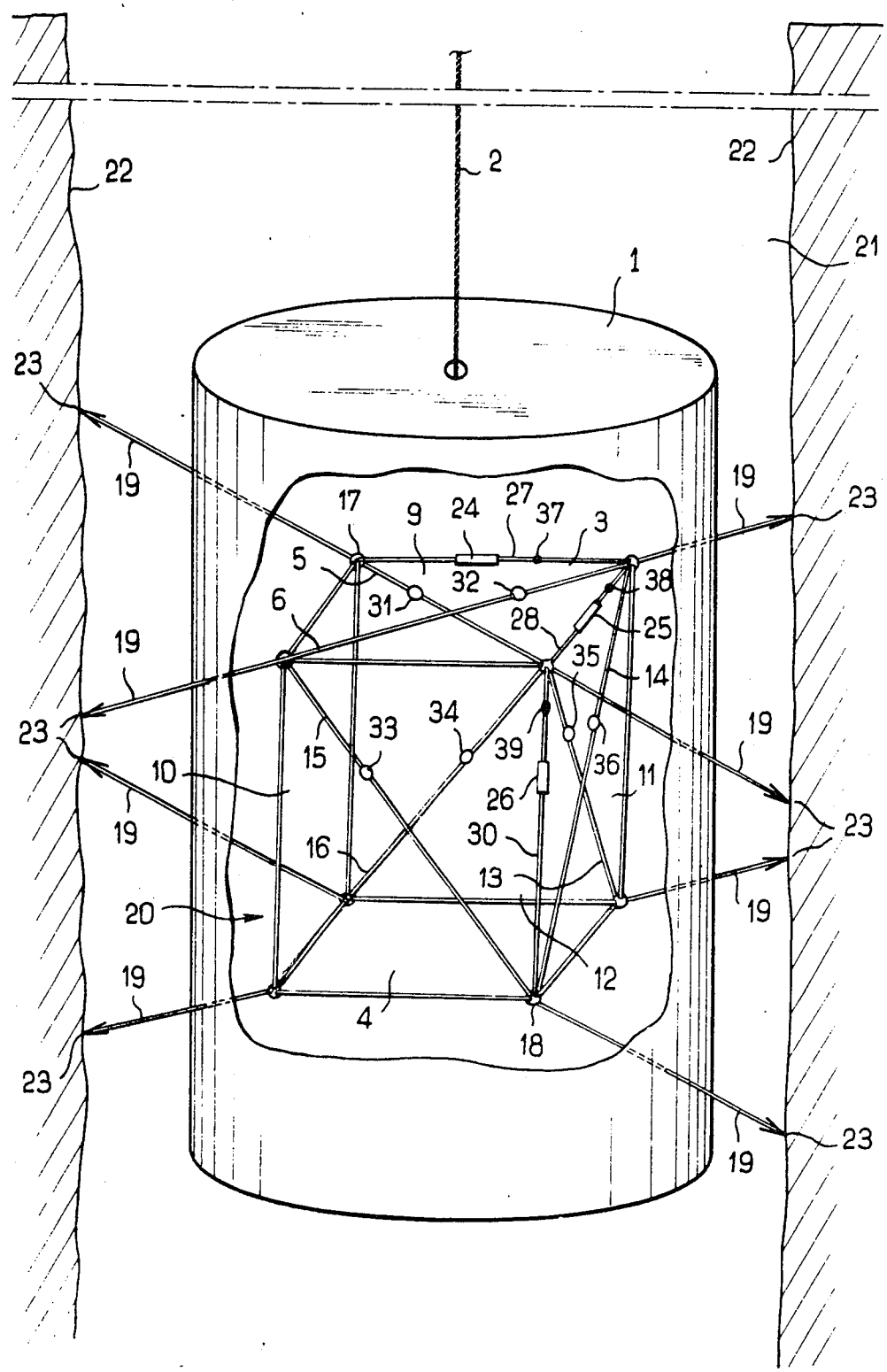

4,775,960

METHOD AND DEVICE FOR MEASURING VIBRATIONAL STRESSES AND VELOCITIES OF WAVES PROPAGATED WITHIN FORMATIONS SURROUNDING A WELLBORE

BACKGROUND OF THE INVENTION

1. Field of the Invention

The present invention relates to a method and a device for measuring vibrational velocities and stresses of waves propagated within formations surrounding a wellbore and more particularly elastic waves propagated within formations to be explored.

2. Description of the Prior Art

Determination and knowledge of certain physical characteristics of the subsurface geological strata make it possible to obtain valuable information for identifying a sedimentary rock formation during seismic exploration, for example.

One of the methods of exploration consists in transmitting elastic waves within the medium to be explored, in receiving in the form of signals the waves reflected and/or refracted by the different reflectors of the medium, then in processing the signals in order to extract information relating to the geological strata in which said waves have been propagated.

A method of this type consists in making use of a tool which is lowered into a wellbore. The tool can be provided solely with receivers whilst the transmitters are located at the surface of the medium to be explored. Alternatively, the tools can be both transmitters and receivers.

The propagation of an elastic wave within the formations surrounding the wellbore produces local strain within these formations, with the result that the particles constituting the medium in a measuring zone or point move away from their position of equilibrium under the action of a stress which is of the vibrational type and at a velocity which is also vibrational.

The velocity and strain waves thus generated are in phase opposition and differ in amplitude. The ratio of amplitude of the strain wave to the amplitude of the velocity wave, changed in sign, is equivalent to a so-called elastic impedance.

Now the determination of elastic impedances of a medium in which a wave is propagated would permit a considerable improvement in what is now customarily designated as formation evaluation in the medium traversed by a wellbore and would make it possible to obtain a better knowledge of certain physical parameters such as, for example, the density of the rock formation and/or the different moduli of elasticity of a given formation and consequently of all the rocks of formations through which the wellbore extends.

Up to the present time, little attention has been given by specialists to direct determination of elastic impedances of a medium for the essential reason that it has proved difficult to make use of conventional means for its practical realization and that, when it was in fact found possible to do so, this direct method was vitiated by too great a degree of error to permit of its being considered as a reliable parameter.

In fact, the practice adopted in terrestrial seismology consists in measuring the vibrational velocity since the measurement is made at the ground surface. Under these conditions and by reason of the fact that the ground is a free surface, the stress is zero (stress node). In ocean seismology, an accessible measurement is provided by vibrational pressure since it is not possible to take up a position at the surface of the water, the measuring units being submerged to a depth of a few meters below the free surface of the water. Consequently, and because surface seismology is involved, it is not possible to gain access to the measurement of elastic impedance of formations in which the transducers are located. In surface reflection seismology, the measurement of reflection coefficients permits access to the impedance contrasts of two adjacent strata but never directly to the impedance of each of these strata.

Moreover, it is necessary to recall that specific transducers for measurement of pressure alone and of velocity alone have different pulse responses. As a result, the values delivered by these different transducers cannot be employed for determination of an elastic impedance which would be excessively erroneous.

SUMMARY OF THE INVENTION

The present invention relates to a method for direct determination of an elastic impedance, which essentially consists in measuring simultaneously the vibrational stress and the vibrational velocity produced by propagation of a vibration within a medium, then in establishing a ratio of magnitudes relating to said vibrational stress and vibrational velocity in respect of a given measuring point.

In accordance with another distinctive feature of the invention, measurement of the vibrational velocity is carried out by measuring its components in three independent directions which may be orthogonal directions, for example.

A further distinctive feature of the invention consists in making use of strain transducers and velocity transducers which have substantially identical pulse responses.

The present invention also relates to a device for carrying out the method aforesaid, of the type permitting direct determination of the impedance of formations which surround a wellbore and within which a strain is induced. Said device essentially includes a deformable polyhedron, means for fixedly coupling the apex and the base of the polyhedron with the wellbore walls, transducers for measuring components of the vibrational velocity in different directions, strain transducers for measuring normal and tangential stresses developed within the polyhedron, each strain transducer aforesaid being mounted on a constituent element of the polyhedron located in the direction of the component to be measured.

BRIEF DESCRIPTION OF THE DRAWING

The single accompanying FIGURE illustrates a device in accordance with one embodiment of the invention for the measurement of vibrational stresses and velocities of waves propagated within formations surrounding a wellbore.

DESCRIPTION OF THE PREFERRED EMBODIMENT

Within an elastic solid subjected to an external load, two types of physical stress in particular are developed internally at each point, namely compressive and shear stresses. The compressive stresses are referred-to as normal stresses whilst the shear stresses are tangential stresses. Although it is unnecessary to go into a detailed discussion of solid-state physics, it is recalled by way of reminder that practically all stresses can be determined on the one hand by measurement of the three components Txx, Tyy, Tzz of compressive stress, for example along three orthogonal axes X, Y, Z, and on the other hand by measurement of the three independent components of shear stress Tzx=Txz, Tyx=Txy and Tzy=Tyz in the different planes defined by the three axes X, Y, Z.

In accordance with the present invention, these parameters are measured by means of a device of the type shown in the single FIGURE. In a particular embodiment of the invention, the device includes a hollow cylinder 1 suspended from a cable 2 which permits displacement of the device within a wellbore 21. The displacement is carried out either directly from the ground surface in the same manner as the displacement of a conventional measuring tool or by means of another structure which is displaced within the wellbore. It is apparent that, each time the device described hereinafter is employed, its positions within the borehole are recorded in order that the strata of formations of interest may subsequently be defined after processing since the surrounding formations through which a wellbore extends can be different from each other as a function of the depth at which they are located. The entire procedure is known to wellbore measurement specialists and therefore does not need to be explained in detail.

Within a suitable protective shell such as a cylindrical shell 1 is housed a deformable polyhedron 20, all the edges of which are pivoted with respect to each other by means of suitable articulations which will not be described.

A polyhedron of the tetrahedron type which simply consists of a pyramid having a triangular base could be employed. In the form of construction shown in the single accompanying FIGURE, the polyhedron is a rectangular parallelepiped 20 having a top face 3, a bottom face 4, and lateral faces 9, 10 and 11, 12. Each edge of the parallelepiped 20 is preferably constituted by a rod which can be either hollow or solid but must have physical characteristics such as to permit measurement of vibrational stress and velocity from which the impedance will be deduced.

The diagonals of at least the top face 3 and of at least two lateral faces 11 and 12 are also constituted by rods 5, 6 and 13 to 16. Should it be so desired, a single diagonal could be placed on each face of the parallelepiped 3, 4 and 9 to 12 on condition that the diagonals are associated in pairs on two opposite faces of the parallelepiped. It accordingly follows that the diagonal 13 could be disposed on the face 10 opposite to the face 11 and in the direction indicated in the FIGURE. Similarly, the diagonal 15 could be placed on the face 9 opposite to the face 12. Thus the pairs of diagonals 13, 14 and 15, 16 would be reconstituted but in two different faces of the parallelepiped.

The four corners 17 of the top face 3 and the four corners 18 of the bottom face 4 are joined to supporting and anchoring means represented schematically by arrows 19 in the FIGURE. The supporting and anchoring means 19 serve to support the parallelepiped 20 within the cylinder while rigidly fixing the device as a whole with respect to the walls 22 of the wellbore 21 in bearing zones 23 so as to ensure that all the strains of the rock of the geological formation are transmitted to the parallelepiped. In this manner, only the vibrational stresses and velocities of the elastic wave which passes through said bearing zones will be measured. The supporting and anchoring means 19 will not be described in detail for reasons of simplification but could consist of small hydraulic and/or pneumatic jacks which are capable of applying anchoring shoes against the walls 22 of the wellbore 21.

The three compressive stress components are measured by means of three transducers 24 to 26. The transducers 24 and 25 are totally embedded within the rods 27 and 28 which constitute the adjacent edges of the top face 3. Similarly, the transducer 26 is also totally embedded within the rod 30.

The three components of the shear stress are measured by means of six transducers 31 to 36 which are coupled together in pairs and each totally embedded within one of the rods 5, 6, 13, 14, 15 and 16.

One of the velocity transducers 37 to 39 which can consist of velocimeters, for example, is mounted on each rod 27, 28 and 30 simply by adhesive bonding. The axes X, Y, Z along which the components of the vibrational velocity are measured accordingly coincide with the directions of the rods 27, 28 and 30 which carry the velocimeters 37 to 39.

The velocimeters 37 to 39 and the strain transducers of the strain-gage type are chosen so as to have substantially identical pulse responses or in other words responses in phase and amplitudes which remain in a constant ratio.

When an elastic wave is propagated within the geological formations of the wellbore 21 and passes through the bearing zones 23, the motion of the rock particles within each zone 23 (which can in practice be assimilated with a measurement point) is transmitted to the parallelepiped 20. The velocimeters 37 to 39 measure the vibrational velocities $v_p$ of the rock particles within said zones whilst the strain gages 24 to 26 and 31 to 36 measure the strains transmitted to the corresponding rods. Said strains are representative of the vibrational stresses to which the rock particles are subjected during propagation of the elastic wave.

Since the vibrational velocity is a vector quantity, one function of the velocimeters is to measure its components in the three directions X, Y and Z, thus permitting access to the modulus of the vibrational velocity.

Since the amplitudes v and p of vibrational velocity and vibrational stress at any given point 23 are determined from the measurements made by the velocimeters are strain gages, it accordingly becomes possible to achieve direct determination of the impedance R by computation of the ratio $|p/v|=R$.

It is worthy of note that the measured impedance R relates to the type of wave of interest. When a compressional wave is involved, for example, the measured impedance R is the compressional impedance $R_p$. Similarly, the shear impedance $R_S$ is measured.

Thus, by means of the present invention, the impedance R of each geological stratum of the wellbore formations can be determined directly.

Moreover, the determination of the impedance R of a geological stratum will henceforth permit direct measurement of the density $\rho$ of the rock forming said stratum, differentiation of the upward-traveling and downward-traveling waves, as well as separation of the P waves (compressional waves) from the S waves (shear waves).

In fact, the conventional measurements carried out within a wellbore as in acoustic well-logging techniques, for example, are intended to determine the propagation velocity C of the wave produced in a given stratum. In point of fact, the device described in the foregoing provides a direct measurement of the impedance R of said stratum. Since the velocity C and the impedance R are related by the equation $R=\rho C$, the density $\rho$ which is equal to $R/C=\rho$ can readily be deduced therefrom.

Any primary wave transmitted to a medium gives rise to secondary waves known in some cases as upward-traveling waves, downward-traveling waves, P waves, S waves, depending on the nature of the primary wave transmitted. Those versed in the art are already aware of the fact that the vibrational velocity ($M_v$) of an upward-traveling wave M can be computed in respect of a medium through which the wave passes by the relation $$M_v = \tfrac{1}{2}(p_v/R - v_v)$$

where
P$_v$ is the total vibrational stress
v$_v$ is the total vibrational velocity
R is the impedance of the medium traversed by the wave.

The vibrational velocity D$_v$ of a downward-traveling wave D can be computed by the relation $$D_v = \tfrac{1}{2}(v_v + p_v/R).$$

It can readily be observed that determination of the values $v_v$, $p_v$ and R permits direct determination of the vibrational velocities M$_v$ and d$_v$ of the upward-traveling waves and downward-traveling waves.

Finally, it is also possible to separate the P waves from the S waves when the compressive stresses and shear stresses measured by the strain gages are known. When the scalar sum of the compression components is formed and when this sum is equal to zero, it is accordingly deduced that the wave involved is an S wave whereas, in the case of the P wave, the scalar sum of the shear components is zero.

No reference has been made in the foregoing either to the means for producing the acoustic wave or to the means for connecting the different transducers to the computing devices which are necessary for determination of the different elastic impedances R or of the resolution of the relations given in the foregoing description, again for the simple reason that they are well-known to those versed in the art and can be adapted to the particular equipment unit which is lowered into the borehole 21.

The device described in the foregoing could also be employed within a wellbore between the outer casing string which is sealed to the borehole wall and an inner tube such as a production tubing string, in which case the device is provided with a passage for the inner tubing.

As will be readily apparent, the invention is not limited in any sense to the exemplified embodiment described with reference to the accompanying FIGURE. Depending on the applications which may be contemplated, many alternative forms of construction within the capacity of those versed in the art may accordingly be contemplated without thereby departing either from the scope or the spirit of the invention.

What is claimed is:

1. A method for direct determination of the impedance of a medium in which an elastic wave is generated and propagated, wherein said method comprises selecting a measuring point within said medium, fixedly coupling said measuring point with a polyhedron in which at least the constituent elements thereof are deformable, measuring directly on elements of the polyhedron the strains developed within said polyhedron by the vibrational stresses produced by propagation of said wave in the measuring point, measuring directly on elements of the polyhedron the components of the vibrational velocity in the measuring point, then establishing a ratio of magnitudes which are representative of said vibrational stress and vibrational velocity generated in said measuring point.

2. A method according to claim 1 wherein the normal and tangential components of the stresses developed within the polyhedron are measured separately.

3. A method according to claim 2, wherein compressional and shear waves are produced in the measuring point by propagation of said elastic wave and wherein the sums of the normal and tangential components of the stresses are formed so as to dissociate the compressional waves from the shear waves produced in the measuring point by propagation of said elastic wave.

4. A method according to claim 1, wherein said method further comprises in determining separately the velocity of propagation of the elastic wave within the medium, then in establishing the ratio of impedance determined at measuring point to the velocity of propagation so as to obtain the density of the medium at the measuring point.

5. A method according to claim 2, wherein the measurement of the vibrational velocity is performed by measuring the components of said velocity in three orthogonal directions.

6. A method according to claim 1 in which the vibration is an elastic wave which produces within the medium a set of waves including upward-traveling waves and downward-traveling waves, wherein, when the impedance of the medium has been determined, said impedance is employed in combination with the total vibrational stress and velocity of all the waves for separating the upward-traveling waves from the downward-traveling waves.

7. A device for direct determination of the impedance of formations which surround a wellbore by propagating a vibration, said vibration producing vibrational stress and vibrational velocity, wherein said device comprises a deformable polyhedron, means for fixedly coupling the summit and the base of the polyhedron with the wellbore walls, transducers for measuring components of the vibrational velocity in different directions, strain transducers for measuring normal and tangential stresses developed within the polyhedron, each strain transducer aforesaid being mounted on a constituent element of the polyhedron located in the direction of the component to be measured.

8. A device according to claim 7, wherein the polyhedron is a tetrahedron, the measuring transducers being mounted on the constituent elements of the tetrahedron.

9. A device according to claim 7, wherein the polyhedron is a parallelepiped whose top and bottom faces are fixedly coupled with the wellbore walls at measuring points.

10. A device according to claim 7, wherein the transducers for measuring vibrational velocity components are mounted on two adjacent edges of one face and on an edge orthogonal to said face.

11. A device according to claim 7, wherein the transducers for measuring normal stress components are mounted on the same edges which carry the transducers for measuring vibrational velocity.

12. A device according to claim 7, wherein the transducers for measuring tangential stress components are each mounted on one face of the parallelepiped and associated in pairs in predetermined directions so as to measure the three components of the tangential stresses developed within said parallelepiped.

13. A device according to claim 12, wherein the transducers for measuring tangential components are associated in pairs, each pair of transducers thus constituted being placed on one face of the parallelepiped and wherein each transducer of one pair is mounted on one diagonal of said face.

14. A device according to claim 13, wherein a pair of transducers is mounted on the diagonals of the top face, a second pair is mounted on the diagonals of the bottom face whilst the third pair is mounted on the diagonals of a lateral face of the parallelepiped.

15. A device according to claim 7, wherein each edge and each diagonal is constituted by a rod.

16. A device according to claim 15, wherein the rods are solid and wherein the vibrational stress transducers are totally embedded within the rods.

17. A device according to claim 16, wherein the vibrational stress transducers are strain gages.

18. A device according to claim 7, wherein the transducers for measuring vibrational velocity consist of velocimeters bonded to the edges which constitute supports for said velocimeters.

19. A device according to claim 7, wherein the polyhedron is housed within a shell formed in particular by a hollow cylinder which can be displaced along the walls of the wellbore.

20. A method for direct determination of the impedance of a medium surrounding a wellbore, in which an elastic wave is generated and propagated within said medium, wherein said method comprises selecting a measuring point within said medium, measuring directly and independently components of strains developed by vibrational stresses produced by propagation of said wave in the measuring point, and independently measuring directly components of vibrational velocity in the measuring point, in three orthogonal directions, then establishing a ratio of magnitudes which are representative of said vibrational stress and vibrational velocity generated in said measuring point.

21. A method according to claim 20, wherein normal and tangential components of the vibrational stresses are measured separately.

22. A method according to claim 21, wherein compressional and shear waves are produced in the measuring point by propagation of said elastic wave, and the sums of the normal and tangential stress components are formed so as to dissociate the compressional waves from the shear waves.

23. A method according to claim 20, wherein said method further comprises determining separately the velocity of propagation of the elastic wave within the medium, then establishing the ratio of impedance determined at a measuring point to the velocity of propagation so as to obtain the density of the medium at the measuring point.

24. A method according to claim 20 in which the vibration is an elastic wave which produces within the medium a set of waves including upward-travelling waves and downward-travelling waves, wherein, when the impedance of the medium has been determined, said impedance is employed in combination with the total vibrational stress and velocity of all the waves for separating the upward-travelling waves from the downward-travelling waves.

* * * * *